United States Patent

[11] 3,616,461

[72] Inventor Georges H. Gorin
 Waltham, Mass.
[21] Appl. No. 882,522
[22] Filed Dec. 5, 1969
[45] Patented Oct. 26, 1971
[73] Assignee LFE Corporation
 Waltham, Mass.

[54] APPARATUS FOR EXCITING A GAS BY MEANS OF AN ELECTRODELESS DISCHARGE
 4 Claims, 1 Drawing Fig.
[52] U.S. Cl..................................................... 204/312,
 204/164, 204/193
[51] Int. Cl..................................................... B01k 1/00
[50] Field of Search............................................ 204/312,
 164, 193

[56] References Cited
UNITED STATES PATENTS
3,410,776 11/1968 Bersin .......................... 204/193

Primary Examiner—John H. Mack
Assistant Examiner—Neil A. Kaplan
Attorney—Robert S. Toperzer ABSTRACT: The apparatus of the present invention is adapted to produce an efficient reaction between a gas and a nongaseous substance at relatively low ambient temperatures. The gas flows through a chamber containing the nongaseous substance and is subjected to an RF field.

A passive resonant circuit is linked by the field through the medium of the gas. Exciting the gas in this way, produces a marked increase in the reaction rate.

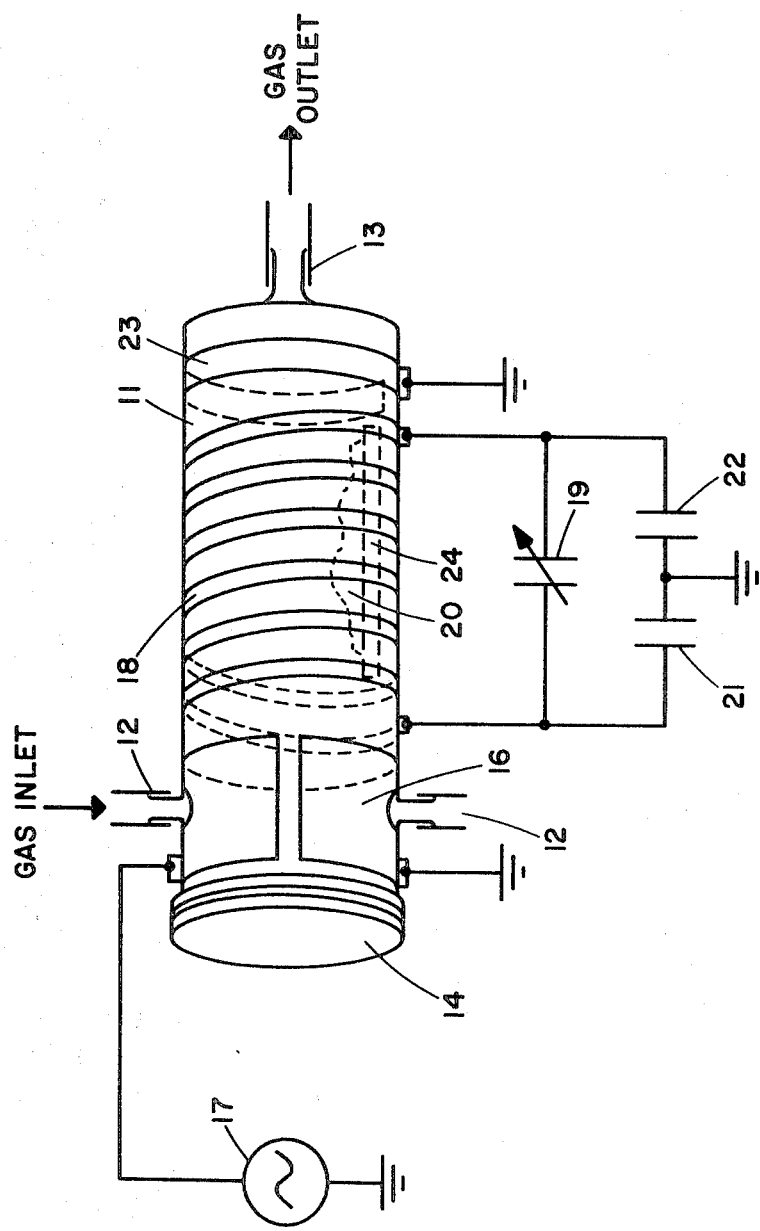

APPARATUS FOR EXCITING A GAS BY MEANS OF AN ELECTRODELESS DISCHARGE

FIELD OF INVENTION

This invention relates to gas reaction apparatus and more particularly it is concerned with apparatus of the type that makes use of an electrodeless discharge to increase the efficiency of a reaction between a gas and a nongaseous substance.

BACKGROUND OF INVENTION

In U.S. Pat. No. 3,410,776 issued to Richard Bersin and assigned to the same assignee as the present invention, apparatus of a similar nature is described in the context of an improvement in the way that the discharge is controlled. The improvement derives from the use of a ground screen surrounding the reaction chamber. The presence of the screen, it was found, facilitates the reaction between the gas and the nongaseous substance.

Still, one of the drawbacks of the apparatus, even with this improvement is the time required to carry out the desired reaction. Oxidation reactions are a case in point; for example, the industrial process of stripping photoresist material from semiconductor elements during the course of their manufacture. Although increased reaction rates can be obtained with more intense discharges that is, by providing more radiofrequency (RF) power to the gas, the cost and complexity of the apparatus increase dramatically. Then too, there is ample evidence to show that very little improvement in reaction efficiency is obtained when the RF power is increased beyond a certain level, depending to some extent, of course, on the nature of the reaction. Although some increase in reaction rate may be attributable to the fact that a temperature rise generally accompanies a power increase, this effect is often undesirable. That is, the basic advantage of the apparatus is its ability to induce reactions at low temperatures, thereby minimizing side reactions, volatilization, and decomposition of the substance undergoing treatment.

Accordingly, the general object of the present invention is to provide more efficient apparatus of the aforementioned character whereby desired heterogeneous reactions can be accomplished in a shorter time.

The novel features of the invention together with further objects and advantages will become apparent from the following detailed description of a preferred embodiment and from the drawing to which the description refers.

In the drawing, the apparatus of the invention is shown in diagrammatic form.

With reference now to the drawing, it will be observed that the numeral 11 designates a cylindrical reaction chamber having two inlets 12 at one end and an outlet 13 extending axially from the other end. Near the inlets, there is a closure in the form of a rubber O-ring and cover 14 which may be made of glass, as is the case with chamber 11.

External to the chamber is a capacitor 16 consisting of a pair of semicircular plates around a portion of the chamber in the vicinity of the inlets 12. One of the plates is connected to the high side of an RF generator 17 while the other plate is grounded. Surrounding the central portion of the chamber is an RF coil 18. Coil 18 is connected across a variable capacitor 19 and also across the series combination of a pair of capacitors 21 and 22 of equal value. The common junction between the latter capacitors is, in turn, connected to ground. Adjacent to the coil, there is an electrode 23 at ground potential which is shaped like a band around the chamber. It acts as an open loop that partially deactivates the excited gas downstream from the reaction zone, and enhances the electrical symmetry between coil 18 and ground. This feature is especially desirable because of the more uniform RF field that is imposed on the gas as a result.

In operation, the chamber is first pumped down through outlet 13 to remove air and residual gases. When a predetermined vacuum is attained, a gas such as oxygen is introduced while pumping is continued at a desired rate. In this way, a continuous flow of gas can be maintained through the chamber.

Generator 17 is then enabled to deliver RF power to the gas via a matching network (not shown) coupled to capacitor 16. The amount of power supplied by the generator may be in the vicinity of a few hundred watts at a frequency approximating 13 megahertz continuous wave. This produces highly excited species of the gas, such as atomic oxygen, capable of entering into reactions that would otherwise be energetically unfavorable. The function of the matching network is to optimize the efficiency of the power transfer and it has not been shown in the drawing, because it is conceptually unrelated to the present invention.

The sample to be treated, 23, is disposed on a boat 24 within the region of the coil 18. By appropriate adjustment of capacitor 19, the coil and its associated capacitance are tuned to resonance at the frequency of the generator. In this way, the passive resonant circuit comprising the coil and its associated capacitance is electrically coupled via the gas to the RF generator and its associated matching network thereby creating a uniformly intense field in the region of the sample. Because of the electron collisions with the heavier particles of the gas, energy is transferred from the field to the atomic and/or molecular constituents of the gas. The net result observed is a marked increase in the reaction rates for most heterogeneous reactions at relatively low ambient temperatures.

What is claimed is:

1. Apparatus for inducing reactions with a gas comprising:
   a reaction chamber,
   means to introduce the gas into said chamber,
   means including an RF generator to produce an RF field and to apply the field to the gas in said chamber, said means including a first reactive element surrounding a first portion of said gas filled chamber,
   and a passive resonant circuit tuned to the frequency of the field said circuit including a second reactive element surrounding a second portion of said gas-filled chamber field whereby said resonant circuit is electrically coupled to the RF generator by means of the gas thereby to uniformly intensify the reaction with the gas.

2. Apparatus as claimed in claim 1 including a third reactive element connected to said first-mentioned reactive element and having an opposite reactance value which is adjustable.

3. Apparatus as claimed in claim 2 including means to connect said circuit to ground at a point which is symmetrical with respect to the ends of said reactive element.

4. Apparatus as claimed in claim 3 including a ground electrode adjacent said first-mentioned reactive element.

* * * * *